May 5, 1936. G. K. O'CONNOR 2,039,924
AIR OPERATED REGULATOR
Filed Oct. 7, 1935

Inventor
George K. O'Connor
by McConkey & Booth
Attorney

Patented May 5, 1936

2,039,924

UNITED STATES PATENT OFFICE 2,039,924

AIR-OPERATED REGULATOR

George K. O'Connor, Evanston, Ill., assignor to Smoot Engineering Corporation, Chicago, Ill., a corporation of Delaware Application October 7, 1935, Serial No. 43,886

16 Claims. (Cl. 121—41)

This invention relates to regulators, and is illustrated as embodied in a novel regulator intended for operation by compressed air.

An object of the invention is to provide a compact and effective arrangement, preferably constructed so that it can readily be operated by hand when desired. From this point of view, one of the important features relates to connecting the balance means of the regulator through a dashpot or the like to a diaphragm which is subject to the air pressure and which is connected and arranged in a novel manner to balance that pressure against yielding means such as a weight or a spring.

I prefer to mount the weight on, or to arrange the spring about, a rod connected to the diaphragm, and when so arranged I utilize the rod for engagement with an adjustable stop, shown as threaded through a tubular support for the lower end of the spring. By shutting off the compressed air from the diaphragm chamber, the rod will be held yieldingly against the stop, and the stop may then be manipulated to control the regulator manually.

The dashpot, or other part carried by the diaphragm, is connected by a return motion lever or the like with the pilot valve and the power piston, so that movement of the diaphragm in one direction or the other correspondingly opens the pilot valve, while the resulting movement of the power piston closes it again.

I also prefer to interconnect the dashpot piston and the balance means by yielding means such as a spring, which is thus actuated by movements of the diaphragm and the balance means to cooperate with the dashpot in compensating for time lag in the operation of the regulator.

The above and other objects and features of the invention will be apparent from the following description of the illustrative embodiment shown in the accompanying drawing, in which.

Figures 1, 2:
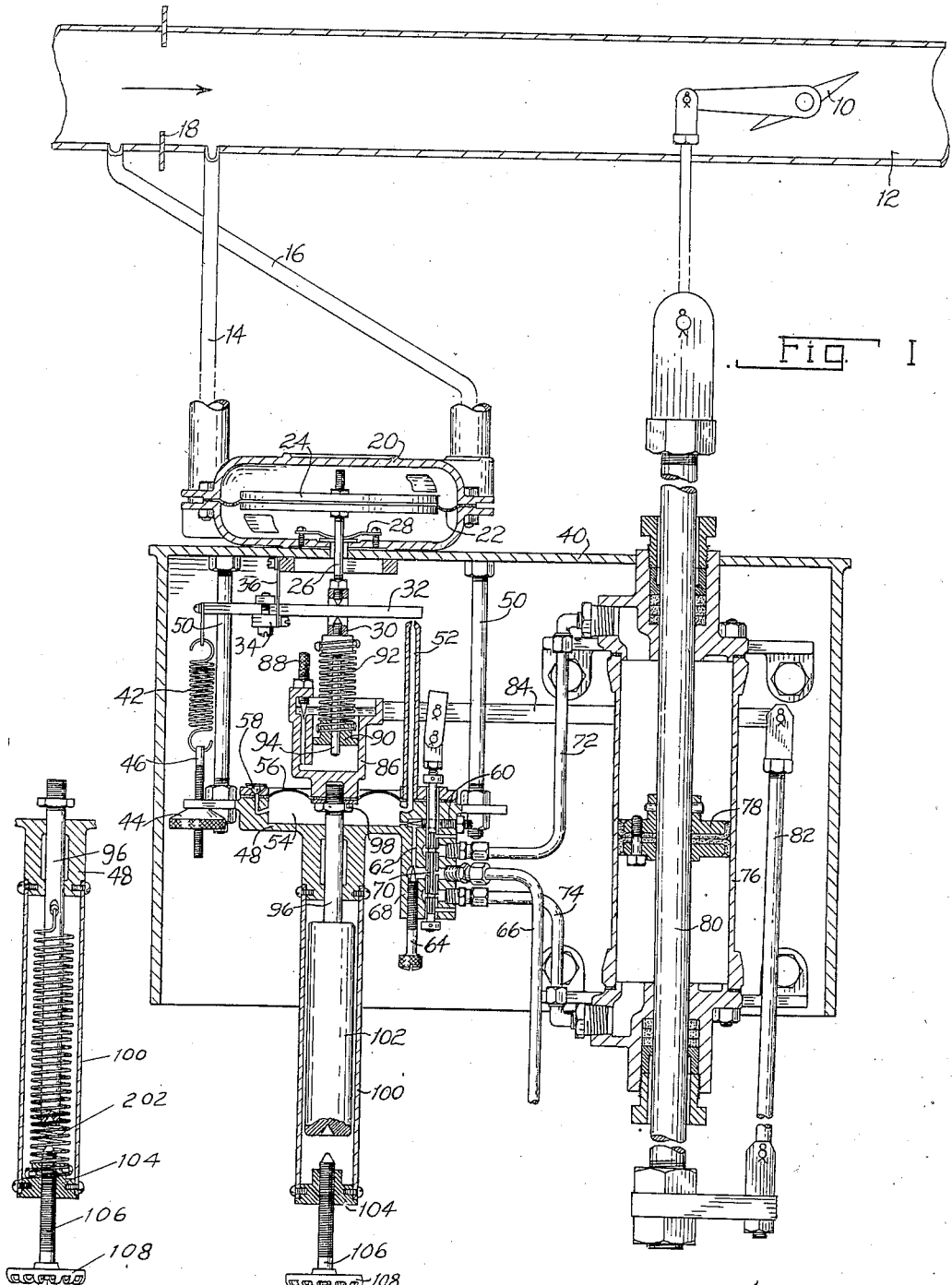
Figure 1 is a vertical section through the improved regulator.
Figure 2 is a partial section showing the use of a spring in place of the weight of Figure 1.

The regulator is illustrated, for purposes of this description, as arranged to control a valve or damper 10 in a fluid conduit 12, according to the differential in the pressures in two small conduits 14 and 16 opening from the conduit 12 on opposite sides of an orifice plate 18. Regulators of the type described have, however, as is well understood in the art, a great many other uses.

The conduits 14 and 16 open respectively into the bottom and top of a casing 20 divided into two chambers by means such as a horizontal diaphragm 22. This diaphragm is clamped, at its center, between two plates 24 through which is adjustably threaded the upper end of a thrust rod 26 passing through an opening in the bottom of casing 20, which opening may be sealed by a small diaphragm 28.

The thrust rod 26 carries at its lower end a yoke 30 carrying means such as oppositely-directed pointed set-screws pivotally embracing a balance lever 32 forming part of the balance means controlled by the pressure on the diaphragm 22. This balance lever is fulcrumed, by means such as a clamp 34, on a vertical strap 36 carried by a bracket 38 adjustably mounted on the regulator casing 40.

The balance lever 32 is acted on at one end by control means such as a spring 42 the tension of which can be adjusted by means such as a nut 44. The nut 44 is threaded on a connecting member 46 attached to the spring, and engages the bottom of a diaphragm casing 48 rigidly secured to the top of housing 40 by means such as posts 50.

As explained more fully in my application No. 31,380 filed July 15, 1935, the spring 42 may be supplemented or replaced by a connection from one of the control diaphragms of a master regulator of the type described in Smoot Reissue Patent No. 16,507.

The right-hand end of the balance lever 32 controls the exhaust of compressed air from a jet 52 communicating with a pressure chamber 54 below a control diaphragm 56 secured across the top of the diaphragm casing 48. The amount of the pressure which can be built up in the chamber 54 is limited by a spring-held relief valve 58.

Compressed air is bled into the chamber 54 past an adjustable needle valve 60, through a passage 62 adapted to be opened and closed by a needle shut-off valve 64 arranged at the bottom of the casing 40, where it is readily accessible. The air comes from any desired source through a conduit 66 which opens into a pilot valve casing 68, shown as being integral with the diaphragm casing 48, and in which the passage 62 is formed.

The pilot valve casing 68 contains a slide type pilot valve 70, which is moved vertically to place the conduit 66 in communication with one or the other of two conduits 72 and 74 (the other of which is placed in communication with the atmosphere). The conduits 72 and 74 lead respectively to the top and bottom of a power cylinder 76 containing a power piston 78 carried by a piston rod 80 movable through suitable packings in the ends of the cylinder. The upper end of the piston rod 80 is shown connected to operate the valve or damper 10.

The lower end of the piston rod 80 is shown connected by a pivoted link 82 to a return-motion lever 84 which is also pivotally connected to the pilot valve 70. The lefthand end of the lever 84 is pivoted to a dashpot cylinder 86 secured to and carried by the control diaphragm 56. The action of the dashpot may be adjusted by means of a needle valve 88 controlling a vertical relief passage.

The dashpot 86 contains a dashpot piston 90 connected, preferably by a spring 92, to the lower end of the yoke 30 (and therefore to the balance lever 32). The ends of the spring 92 are shown secured to the yoke 30 and the dashpot piston 90, and the yoke 30 is shown as having a downwardly extending guide rod 94 freely sliding through an opening in the piston 90, thereby insuring alinement of the parts.

The dashpot cylinder 86 is shown secured to the diaphragm 56 by a vertical rod 96 threaded into the base of the cylinder and having threaded thereon a nut 98 engaging a washer sealed against the diaphragm. The rod 96 slides in bearings formed in the diaphragm casing 48, and extends into a sleeve 100 secured to the bottom of the diaphragm casing. The lower end of the rod is urged downwardly by yielding means such as a weight 102.

An adjustable vertical stop 106, alined with the rod 96, and formed with a conical end adapted to engage a corresponding seat in the lower end of the weight 102, is threaded through a lower plug 104 secured in the end of the sleeve 100. The stop 106 can be conveniently manipulated by means such as a hand wheel 108. In shipping the device, the stop 106 is turned up into engagement with the weight 102, and holds it securely against the bottom of the diaphragm casing. By shutting off the valve 64, the weight 102 drops against the stop 106, and the regulator can be controlled manually by manipulating the hand wheel 108. As shown in Figure 2, instead of the weight 102, there may be a tension coil spring 202, connected at its opposite ends respectively to the rod 96 and to the plug 104. In this case the rod 96 is made long enough to be engageable with the stop 106.

In operation, changes in the pressures in the casing 20 raise or lower the right-hand end of the balance lever 32; if the lever is raised the air issues more freely from the nozzle 52 and the pressure in the chamber 54 drops, while if the lever is lowered the air is throttled and the pressure in chamber 54 rises. The pressure in chamber 54 balances against weight 102, or spring 202 (which is under tension), and since this is substantially constant the changes in pressure in chamber 54 raise or lower the diaphragm 56 and the dashpot 86—90 carried thereby.

The movements of the dashpot rock the lever 84, which at this time fulcrums at its right end, to raise or lower the pilot valve 70, admitting compressed air to one end of the cylinder 76 and exhausting the other end to the atmosphere. The resultant movement of the piston 78 rocks the lever 84 about its left end to close the valve 70 again when the movement of piston 78 corresponds to the unbalance of the forces in the casing 20.

The return-motion connections used when the power piston and cylinder are outside the casing 40 are described in my above-identified application No. 31,380.

The movement of the dashpot also acts through the spring 92 on the lever 32 in a direction just the opposite of the action of the diaphragm 22 thereon, thus anticipating the changes of pressure in conduits 14 and 16 which will be caused by the opening or closing of the valve or damper 10 corresponding to the movement of the piston 78.

The yielding pressure thus applied to the balance lever 32 fades out gradually as the dashpot piston 90 slowly moves to its new position, while at the same time the new pressures build up in the conduits 14 and 16. By suitable adjustment of the needle valve 88 the one effect can be made to cancel the other out, so that the dashpot and the spring 92 in effect form a stabilizer which compensates for time lag in the regulation of the device (such as damper 10) being controlled and in its effect on the pressure or other characteristic which it governs.

While one illustrative embodiment has been described in detail, it is not my intention to limit the scope of the invention to that particular embodiment, or otherwise than by the terms of the appended claims.

I claim:

1. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder.

2. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder.

3. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, return motion means connecting the power piston and said valve and the dashpot cylinder, and an adjustable stop arranged to be set to hold said rod and the parts attached thereto.

4. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, return motion means connecting the power piston and said valve and the dashpot cylinder, and an adjustable stop arranged to be set to hold said rod and the parts attached thereto.

5. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise movable rod operatively secured to the diaphragm, a spring acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, said spring acting on the rod being arranged about the rod and attached thereto at one end and having its other end fixed, and in combination with an adjustable stop engageable with the end of the rod.

6. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise movable rod operatively secured to the diaphragm, a spring acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, said spring acting on the rod being arranged about the rod and attached thereto at one end and having its other end fixed, and in combination with an adjustable stop engageable with the end of the rod.

7. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise movable rod operatively secured to the diaphragm, a weight acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder.

8. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise movable rod operatively secured to the diaphragm, a weight acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder.

9. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise-movable rod operatively secured to the diaphragm, a spring acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, said spring acting on the rod being arranged about the rod and attached thereto at one end and having its other end fixed and in combination with an adjustable stop engageable with the end of the rod and with means for shutting off the fluid acting on the diaphragm, whereby when the fluid is so shut off the spring will hold the rod against the stop and the stop can be adjusted for manually controlling the operation of the pilot valve.

10. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise-movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, in combination with an adjustable stop engageable with the end of the rod and with means for shutting off the fluid acting on the diaphragm, whereby when the fluid is so shut off the yielding means will hold the rod against the stop and the stop can be adjusted for manually controlling the operation of the pilot valve.

11. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise-movable rod operatively secured to the diaphragm, a spring acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, said spring acting on the rod being arranged about the rod and attached thereto at one end and having its other end fixed, and in combination with an adjustable stop engageable with the end of the rod and with means for shutting off the fluid acting on the diaphragm, whereby when the fluid is so shut off the spring will hold the rod against the stop and the stop can be adjusted for manually controlling the operation of the pilot valve.

12. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise-movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, in combination with an adjustable stop engageable with the end of the rod and with means for shutting off the fluid acting on the diaphragm, whereby when the fluid is so shut off the yielding means will hold the rod against the stop and the stop can be adjusted for manually controlling the operation of the pilot valve.

13. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, and in combination with an adjustable stop engageable with the end of the rod, said diaphragm and said dashpot cylinder and piston and said first spring and said rod and said yielding means and said stop all having a common axis.

14. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, a spring connecting the dashpot piston and the balance means, a lengthwise-movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, in combination with an adjustable stop engageable with the end of the rod and with means for shutting off the fluid acting on the diaphragm, whereby when the fluid is so shut off the yielding means will hold the rod against the stop and the stop can be adjusted for manually controlling the operation of the pilot valve, said diaphragm and said dashpot cylinder and piston and said first spring and said rod and said yielding means and said stop all having a common axis.

15. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise-movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, in combination with an adjustable stop engageable with the end of the rod, said diaphragm and said dashpot cylinder and piston and said rod and said yielding means and said stop all having a common axis.

16. A regulator comprising balance means, a diaphragm, means controlled by the balance means for varying the pressure of a fluid acting against one face of the diaphragm, a dashpot cylinder carried by the other face of the diaphragm, a dashpot piston in said cylinder, means connecting the dashpot piston and the balance means, a lengthwise-movable rod operatively secured to the diaphragm, yielding means acting on said rod and resisting movement of the diaphragm caused by said fluid, a power cylinder and piston, a pilot valve and conduits controlled thereby for admitting power fluid to one end or the other of the power cylinder, and return motion means connecting the power piston and said valve and the dashpot cylinder, in combination with an adjustable stop engageable with the end of the rod and with means for shutting off the fluid acting on the diaphragm, whereby when the fluid is so shut off the yielding means will hold the rod against the stop and the stop can be adjusted for manually controlling the operation of the pilot valve, said diaphragm and said dashpot cylinder and piston and said rod and said means and said stop all having a common axis.

GEORGE K. O'CONNOR.